United States Patent
Matsumoto et al.

(10) Patent No.: US 9,181,126 B2
(45) Date of Patent: *Nov. 10, 2015

(54) GLASS FUSION METHOD

(75) Inventors: Satoshi Matsumoto, Hamamatsu (JP); Toshimitsu Wakuda, Hamamatsu (JP)

(73) Assignee: HAMAMATSU PHOTONICS K.K., Hamamatsu-shi, Shizuoka (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/345,199

(22) Filed: Jan. 6, 2012

(65) Prior Publication Data

US 2012/0151965 A1 Jun. 21, 2012

Related U.S. Application Data

(63) Continuation of application No. 12/994,320, filed as application No. PCT/JP2009/058764 on May 11, 2009.

(30) Foreign Application Priority Data

May 26, 2008 (JP) ................. P2008-136843

(51) Int. Cl.
*C03C 27/04* (2006.01)
*C03C 27/06* (2006.01)
*C03C 8/24* (2006.01)

(52) U.S. Cl.
CPC .. *C03C 27/06* (2013.01); *C03C 8/24* (2013.01)

(58) Field of Classification Search
None
See application file for complete search history.

(56) References Cited

U.S. PATENT DOCUMENTS

| | | | |
|---|---|---|---|
| 3,453,097 A | | 7/1969 | Hafner |
| 3,663,793 A | * | 5/1972 | Petro et al. ............ 219/121.69 |
| 4,343,833 A | | 8/1982 | Sawae et al. |
| 5,489,321 A | | 2/1996 | Tracy et al. |
| 6,565,400 B1 | | 5/2003 | Lee et al. |
| 7,371,143 B2 | | 5/2008 | Becken et al. |
| 7,641,976 B2 | | 1/2010 | Lamberson et al. |
| 7,820,941 B2 | | 10/2010 | Brown et al. |
| 7,834,550 B2 | | 11/2010 | Lee et al. |
| 7,932,670 B2 | | 4/2011 | Yoo et al. |
| 8,063,561 B2 | | 11/2011 | Choi et al. |
| 8,440,479 B2 | | 5/2013 | Nguyen et al. |

(Continued)

FOREIGN PATENT DOCUMENTS

| | | |
|---|---|---|
| CN | 1329395 | 1/2002 |
| CN | 1738777 | 2/2006 |

(Continued)

OTHER PUBLICATIONS

U.S. Office Action dated Jun. 28, 2012 that issued in U.S. Appl. No. 12/994,320 including Double Patenting Rejections on pp. 7-9.

(Continued)

*Primary Examiner* — Lisa Herring
(74) *Attorney, Agent, or Firm* — Drinker Biddle & Reath LLP (57) ABSTRACT

A glass layer fixing method for manufacturing a glass layer fixing member by fixing a glass layer to a first glass member, includes the steps of disposing the glass layer on the first glass member along a region to be fused, the glass layer containing a glass powder and a laser-absorbing material and irradiating the region to be fused therealong with a first laser beam, so as to melt the glass layer, fix the glass layer to the first glass member, and increase a laser absorptance of the glass layer.

2 Claims, 8 Drawing Sheets

(56) References Cited

U.S. PATENT DOCUMENTS

| | | | |
|---|---|---|---|
| 8,490,434 | B2 | 7/2013 | Watanabe et al. |
| 8,516,852 | B2 | 8/2013 | Matsumoto et al. |
| 2004/0069017 | A1 | 4/2004 | Li et al. |
| 2004/0207314 | A1 | 10/2004 | Aitken et al. |
| 2005/0103755 | A1 | 5/2005 | Baker et al. |
| 2006/0082298 | A1 | 4/2006 | Becken et al. |
| 2006/0084348 | A1 | 4/2006 | Becken et al. |
| 2007/0007894 | A1* | 1/2007 | Aitken et al. ............... 313/512 |
| 2007/0053088 | A1 | 3/2007 | Kranz et al. |
| 2007/0128967 | A1 | 6/2007 | Becken et al. |
| 2007/0170845 | A1* | 7/2007 | Choi et al. ............... 313/504 |
| 2007/0173167 | A1 | 7/2007 | Choi |
| 2008/0106194 | A1 | 5/2008 | Logunov et al. |
| 2008/0124558 | A1 | 5/2008 | Boek et al. |
| 2008/0135175 | A1 | 6/2008 | Higuchi |
| 2008/0182062 | A1 | 7/2008 | Becken et al. |
| 2009/0071588 | A1 | 3/2009 | Kimura et al. |
| 2009/0080055 | A1 | 3/2009 | Baur et al. |
| 2009/0086325 | A1 | 4/2009 | Liu et al. |
| 2009/0110882 | A1 | 4/2009 | Higuchi |
| 2009/0142984 | A1 | 6/2009 | Logunov et al. |
| 2009/0297861 | A1 | 12/2009 | Banks et al. |
| 2009/0297862 | A1* | 12/2009 | Boek et al. ............... 428/428 |
| 2009/0308105 | A1 | 12/2009 | Pastel et al. |
| 2010/0006228 | A1 | 1/2010 | Abe et al. |
| 2010/0095705 | A1 | 4/2010 | Burkhalter et al. |
| 2010/0116119 | A1 | 5/2010 | Bayne |
| 2010/0129666 | A1 | 5/2010 | Logunov et al. |
| 2010/0154476 | A1 | 6/2010 | Becken et al. |
| 2010/0267307 | A1 | 10/2010 | Park et al. |
| 2010/0304513 | A1 | 12/2010 | Nguyen et al. |
| 2011/0001424 | A1 | 1/2011 | Logunov et al. |
| 2011/0061789 | A1 | 3/2011 | Matsumoto |
| 2011/0067448 | A1 | 3/2011 | Matsumoto et al. |
| 2011/0072855 | A1 | 3/2011 | Matsumoto et al. |
| 2011/0088430 | A1 | 4/2011 | Matsumoto |
| 2011/0088431 | A1 | 4/2011 | Matsumoto |
| 2011/0135857 | A1 | 6/2011 | Logunov et al. |
| 2011/0169108 | A1 | 7/2011 | Gardner et al. |
| 2011/0223360 | A1 | 9/2011 | Shibuya et al. |
| 2011/0223371 | A1 | 9/2011 | Kawanami |
| 2011/0256407 | A1 | 10/2011 | Boek et al. |
| 2011/0265518 | A1 | 11/2011 | Matsumoto et al. |
| 2012/0111059 | A1 | 5/2012 | Watanabe et al. |
| 2012/0147538 | A1 | 6/2012 | Kawanami et al. |
| 2012/0151965 | A1 | 6/2012 | Matsumoto et al. |
| 2012/0156406 | A1 | 6/2012 | Banks et al. |
| 2012/0222450 | A1 | 9/2012 | Lamberson et al. |
| 2012/0234048 | A1 | 9/2012 | Matsumoto |
| 2012/0240628 | A1 | 9/2012 | Matsumoto |
| 2012/0240629 | A1 | 9/2012 | Matsumoto |
| 2012/0240630 | A1 | 9/2012 | Matsumoto |
| 2012/0240631 | A1 | 9/2012 | Matsumoto |
| 2012/0240632 | A1 | 9/2012 | Matsumoto |
| 2012/0240633 | A1 | 9/2012 | Matsumoto |
| 2012/0247153 | A1 | 10/2012 | Matsumoto |
| 2012/0260694 | A1 | 10/2012 | Matsumoto |
| 2012/0285200 | A1 | 11/2012 | Tanaka |
| 2012/0287026 | A1 | 11/2012 | Masuda |
| 2012/0318023 | A1 | 12/2012 | Shimomura |
| 2012/0320444 | A1 | 12/2012 | Baur et al. |
| 2013/0011598 | A1 | 1/2013 | Kawanami et al. |
| 2013/0104980 | A1 | 5/2013 | Sridharan et al. |
| 2013/0111953 | A1 | 5/2013 | Maloney et al. |
| 2013/0134396 | A1 | 5/2013 | Shimomura et al. |
| 2013/0174608 | A1 | 7/2013 | Takeuchi et al. |
| 2013/0237115 | A1 | 9/2013 | Choi et al. |
| 2013/0280981 | A1 | 10/2013 | Lee |
| 2013/0314760 | A1 | 11/2013 | Baur et al. |

FOREIGN PATENT DOCUMENTS

| | | |
|---|---|---|
| CN | 1798708 | 7/2006 |
| CN | 1798710 | 7/2006 |
| CN | 1836177 | 9/2006 |
| CN | 101005915 | 7/2007 |
| CN | 101095247 | 12/2007 |
| CN | 101103429 | 1/2008 |
| CN | 101139165 | 3/2008 |
| CN | 100409392 C | 8/2008 |
| CN | 101312234 | 11/2008 |
| CN | 101386477 | 3/2009 |
| CN | 101434453 | 5/2009 |
| CN | 101501808 | 8/2009 |
| CN | 102056858 | 5/2011 |
| JP | 2-120259 | 5/1990 |
| JP | 5-166462 | 7/1993 |
| JP | 2000-313630 | 11/2000 |
| JP | 2002-015108 | 1/2002 |
| JP | 2002-224871 | 8/2002 |
| JP | 2002-287107 | 10/2002 |
| JP | 2002-366050 | 12/2002 |
| JP | 2002-367514 | 12/2002 |
| JP | 2004-182567 | 7/2004 |
| JP | 2005-007665 | 1/2005 |
| JP | 2005-213125 | 8/2005 |
| JP | 2006-151774 | 6/2006 |
| JP | 2006-524419 | 10/2006 |
| JP | 2007-90405 | 4/2007 |
| JP | 2007-264135 | 10/2007 |
| JP | 2008-115057 | 5/2008 |
| JP | 2008-115067 | 5/2008 |
| JP | 2008-127223 | 6/2008 |
| JP | 2008-527655 | 7/2008 |
| JP | 2009-123421 | 6/2009 |
| JP | 2009-196862 | 9/2009 |
| KR | 10-0350323 | 3/2002 |
| KR | 10-2007-0003681 | 5/2007 |
| TW | I495409 | 7/2002 |
| TW | 200516064 | 5/2005 |
| TW | I255934 | 6/2006 |
| TW | 200733787 | 9/2007 |
| TW | 200737370 | 10/2007 |
| TW | 200822789 | 5/2008 |
| TW | 200911438 | 3/2009 |
| TW | 200944908 | 11/2009 |
| WO | WO 2007/067533 | 6/2007 |
| WO | WO 2009/131144 | 10/2009 |
| WO | 2009/150975 | 12/2009 |
| WO | 2009/150976 | 12/2009 |
| WO | 2009/157281 | 12/2009 |
| WO | 2009/157282 | 12/2009 |

OTHER PUBLICATIONS

U.S. Office Action dated Jul. 9, 2012 that issued in U.S. Appl. No. 12/994,321 including Double Patenting Rejections on pp. 7-9.

Cheung, Kerry, "Die-Level Glass Frit Vacuum Packaging for a Micro-Fuel Processor System," Massachusetts Institute of Technology, Jun. 2005, pp. 17-19.

U.S. Office Action dated Apr. 25, 2013 that issued in U.S. Appl. No. 12/994,539 including Double Patenting rejections on pp. 5-8.

JP 20022366050 (Human Translation), retrieved from USPTO Translation Services and attached to the above-listed U.S. Office Action dated Apr. 25, 2013 in U.S. Appl. No. 12/994,539.

JP 2008115057 (Human Translation), retrieved from USPTO Translation Services and attached to the above-listed U.S. Office Action dated Apr. 25, 2013 in U.S. Appl. No. 12/994,539.

JP 20022366050 (Machine Translation), as attached to Office Action dated Jun. 1, 2012 in U.S. Appl. No. 12/994,354.

JP 2008115057 (Machine Translation), as attached to Office Action dated Jun. 1, 2012 in U.S. Appl. No. 12/994,354.

U.S. Office Action dated May 9, 2013 that issued in U.S. Appl. No. 12/994,399 including Double Patenting Rejections on pp. 6-10.

U.S. Office Action dated Jun. 3, 2014 that issued in U.S. Appl. No. 13/511,683 including Double Patenting Rejections on pp. 5-11.

U.S. Office Action dated Apr. 25, 2014 that issued in U.S. Appl. No. 13/511,721 including Double Patenting Rejections on pp. 2-3.

U.S. Office Action dated Jan. 28, 2014 that issued in U.S. Appl. No. 13/511,688 including Double Patenting Rejections on pp. 4-8.

(56) References Cited

OTHER PUBLICATIONS

U.S. Office Action dated Jul. 31, 2014 that issued in U.S. Appl. No. 12/994,354 including Double Patenting Rejections on pp. 7-10.
U.S. Office Action dated Jul. 2, 2014 that issued in U.S. Appl. No. 13/511,754 including Double Patenting Rejections on pp. 5-8.
U.S. Office Action dated Jul. 1, 2014 that issued in U.S. Appl. No. 13/511,738 including Double Patenting Rejections on pp. 4-5.
U.S. Office Action dated Jan. 16, 2014 that issued in U.S. Appl. No. 13/511,735 including Double Patenting Rejections on pp. 4-8.
U.S. Office Action dated Jan. 22, 2014 that issued in U.S. Appl. No. 13/509,112 including Double Patenting Rejections on pp. 4-5.
U.S. Office Action dated Jul. 1, 2014 that issued in U.S. Appl. No. 13/511,747 including Double Patenting Rejections on pp. 4-5.

* cited by examiner

GLASS FUSION METHOD

This is a continuation application of copending application Ser. No. 12/994,320, having a §371 date of Nov. 23, 2010, which is a national stage filing based on PCT International Application No. PCT/JP2009/058764, filed on May 11, 2009. The copending application Ser. No. 12/994,320 is incorporated by reference herein in its entirety.

TECHNICAL FIELD

The present invention relates to a glass fusing method for manufacturing a glass fusing structure by fusing glass members together.

BACKGROUND ART

Known as a conventional glass fusing method in the above-mentioned technical field is one comprising burning a glass layer containing a laser-absorbing pigment onto one glass member along a region to be fused, then overlaying the other glass member on the former glass member such that the glass layer is interposed therebetween, and irradiating the region to be fused therealong with a laser beam, so as to fuse one glass member and the other glass member together.

A typical technique for burning a glass layer onto a glass member is one comprising firmly attaching a glass layer to the glass member by removing an organic solvent and a binder from a paste layer containing a glass frit, a laser-absorbing pigment, the organic solvent, and the binder; and then heating the glass member having the glass layer firmly attached thereto in a firing furnace, so as to melt the glass layer, thereby burning the glass layer onto the glass member (see, for example, Patent Literature 1).

On the other hand, proposed from the viewpoint of suppressing the increase in energy consumption and burning time caused by the use of the firing furnace (i.e., the viewpoint of high efficiency) is a technique which irradiates a glass layer attached to a glass member with a laser beam, so as to melt the glass layer, thereby burning the glass layer onto the glass member (see, for example, Patent Literature 2).

CITATION LIST

Patent Literature

Patent Literature 1: Japanese Translated International Patent Application Laid-Open No. 2006-524419
Patent Literature 2: Japanese Patent Application Laid-Open No. 2002-366050

SUMMARY OF INVENTION

Technical Problem

However, there have been cases where glass members having glass layers burned thereonto by laser light irradiation are damaged by cracks and the like occurring at the time of burning and their fusion thereafter.

In view of such circumstances, it is an object of the present invention to provide a glass fusing method which can efficiently fuse glass members together by preventing the glass members from being damaged.

Solution to Problem

Figure 7:
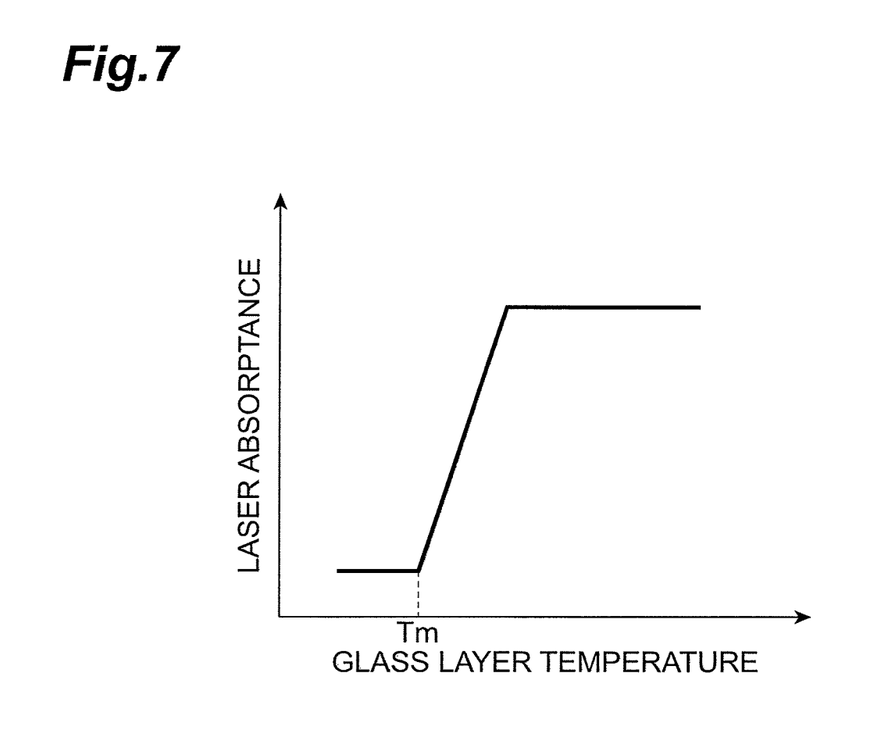
FIG. 7 is a graph illustrating the relationship between the temperature and laser absorptance of a glass layer.
Figure 8:
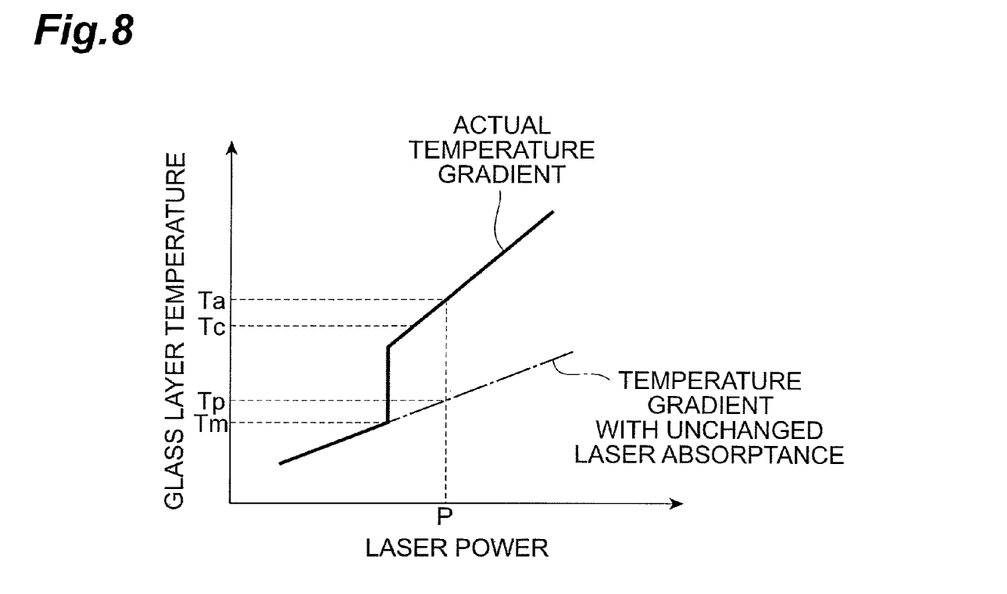
FIG. 8 is a graph illustrating the relationship between the laser power and the temperature of the glass layer.

For achieving the above-mentioned object, the inventors conducted diligent studies and, as a result, have found out that the burning of a glass layer by laser beam irradiation leads to damages in a glass member because of the fact that the laser absorptance of the glass layer drastically increases when the temperature of the glass layer exceeds its melting point Tm at the time of burning as illustrated in FIG. 7. That is, in the glass layer firmly attached to the glass member, voids formed by the removal of the binder and the particle property of the glass frit produce scattering of light exceeding the absorption characteristic of the laser-absorbing pigment, so that the laser absorptance is low (e.g., the glass layer appears whiter under visible light). When a laser beam is emitted with such a laser power P that the glass layer attains a temperature Tp higher than the melting point Tm but lower than its crystallization temperature Tc as illustrated in FIG. 8, the glass frit melts to fill the voids and loses the particle property, so that the laser-absorbing pigment remarkably exhibits its absorption characteristic, whereby the glass layer drastically increases its laser absorptance (e.g., appears darker under visible light). This causes the glass layer to absorb the laser beam more than expected, thereby generating cracks in the glass member because of a heat shock due to excessive heat input. In practice, as illustrated in FIG. 8, the laser irradiation at the laser power P lets the glass layer reach a temperature Ta higher than the crystallization temperature Tc. When a portion of the glass layer on the side opposite from the glass member onto which it is to be burned (i.e., a portion of the glass layer located on the side of the glass member to which it is to be fused) is crystallized by excessive heat input, the melting point rises in this portion. This makes it necessary to emit the laser beam with a higher laser power at the time of fusing the glass members together thereafter so as to melt the portion of the glass layer located on the side of the glass member to which it is to be fused, whereby cracks are generated in the glass member because of a heat shock due to excessive heat input as in the burning. The inventors have conducted further studies based on this finding, thereby completing the present invention. The change in color of the glass layer under visible light in the case where the laser absorptance of the glass layer is enhanced by the melting of the glass layer is not limited to the change from a whiter state to a darker state. For example, laser-absorbing pigments for near-infrared laser beams include those exhibiting green when the glass layer melts.

The glass fusing method in accordance with the present invention is a glass fusing method for manufacturing a glass fusing structure by fusing first and second glass members together, the method comprising the steps of disposing a glass layer between the first glass member and a thermal conductor along a region to be fused, the glass layer being formed by removing an organic solvent and a binder from a paste layer containing a glass powder, a laser-absorbing material, the organic solvent and the binder; irradiating the region to be fused therealong with a first laser beam while using the thermal conductor as a heatsink, so as to melt the glass layer disposed between the first glass member and the thermal conductor, and fix the glass layer to the first glass member; and overlaying the second glass member on the first glass member having the glass layer fixed thereto such that the glass layer is interposed therebetween, and irradiating the region to be fused therealong with a second laser beam, so as to fuse the first and second glass members together.

In this glass fusing method, the glass layer is disposed between the first glass member and the thermal conductor along the region to be fused, and the first laser beam is emitted while using the thermal conductor as a heatsink, so as to melt the glass layer and fix the glass layer to the first glass member. While the glass layer drastically increases its laser absorptance when being fixed, the thermal conductor serves as the heatsink and draws heat from the glass layer, thereby inhibiting the glass layer from falling into an excessive heat input state. As a consequence, even when the glass layer is fixed to the first glass member by irradiation with the first laser beam, the glass members can be prevented from being damaged by cracks occurring therein and the like at the time of fixing the glass layer and fusing the glass members together thereafter. Therefore, this glass fusing method can prevent the glass members from being damaged and efficiently fuse the glass members together.

Preferably, in the glass fusing method in accordance with the present invention, the thermal conductor has a thermal conductivity higher than that of the glass powder. This allows the thermal conductor to serve as the heatsink and draw heat efficiently from the glass layer. More preferably, in this case, the thermal conductivity of the thermal conductor is higher than that of the first glass member. This allows the thermal conductor to serve as the heatsink and draw heat more efficiently from the glass layer.

Preferably, in the glass fusing method in accordance with the present invention, the difference between coefficients of linear expansion of the glass powder and the thermal conductor is greater than the difference between coefficients of linear expansion of the glass powder and the first glass member. This can reliably prevent the glass layer from firmly attaching to the thermal conductor when fixing the glass layer to the first glass member.

Preferably, in the glass fusing method in accordance with the present invention, the first laser beam irradiates the glass layer from the first glass member side. This can fully heat the interface part between the first glass member and the glass layer, thereby strongly fixing the glass layer to the first glass member.

Advantageous Effects of Invention

The present invention can efficiently fuse glass members together by preventing the glass members from being damaged.

DESCRIPTION OF EMBODIMENTS

In the following, preferred embodiments of the present invention will be explained in detail with reference to the drawings. In the drawings, the same or equivalent parts will be referred to with the same signs while omitting their overlapping descriptions.

Figure 1:
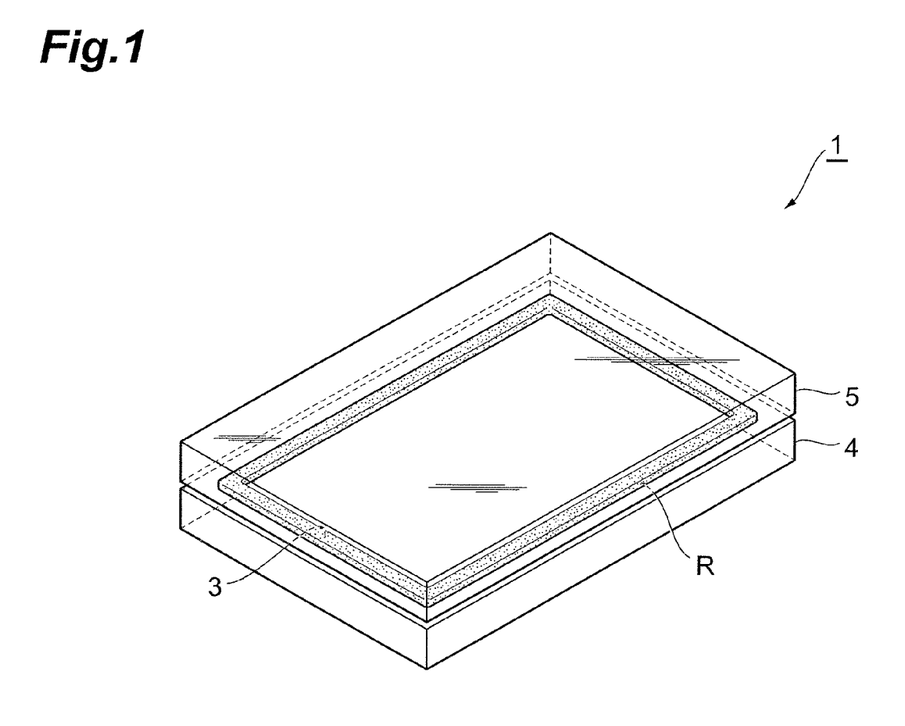
FIG. 1 is a perspective view for explaining a glass fusing structure manufactured by an embodiment of the glass fusing method in accordance with the present invention.

FIG. 1 is a perspective view of the glass fusing structure manufactured by an embodiment of the glass fusing method in accordance with the present invention. As illustrated in FIG. 1, the glass fusing structure 1 is a fusion-bonded grass structure in which glass members (first and second glass members) 4, 5 are fused together through a glass layer 3 formed along a region R to be fused. For example, each of the glass members 4, 5 is a rectangular plate-shaped member made of alkali-free glass having a thickness of 0.7 mm, while the region R to be fused is set like a rectangular ring along the outer edges of the glass members 4, 5. For example, the glass layer 3 is made of low-melting glass (vanadium-phosphate-based glass, lead borosilicate glass, or the like) and formed into a rectangular ring along the region R to be fused.

The glass fusing method for manufacturing the above-mentioned glass fusing structure 1 will now be explained.

Figure 2:
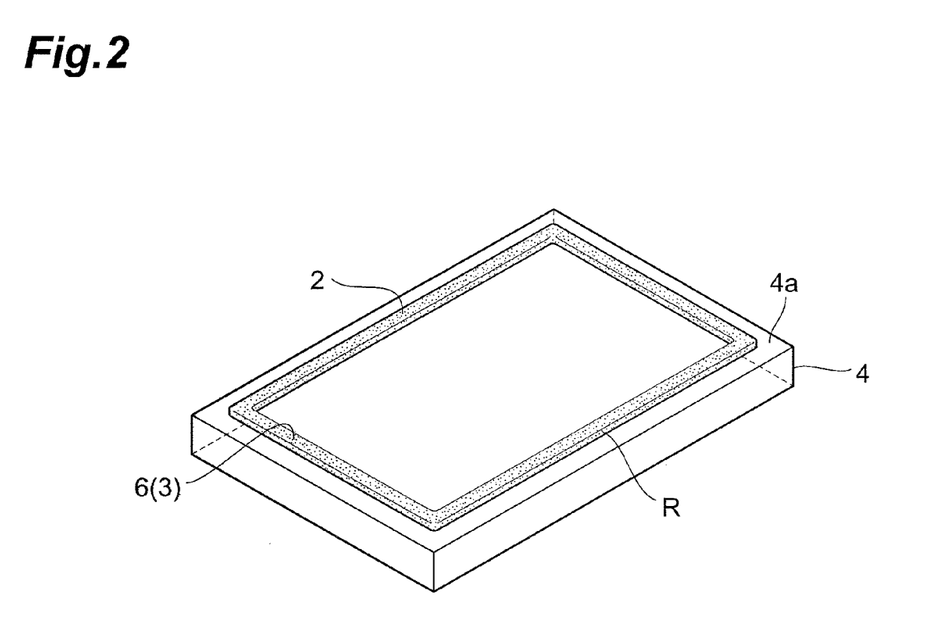
FIG. 2 is a perspective view for explaining the glass fusing method for manufacturing the glass fusing structure of FIG. 1.

First, as illustrated in FIG. 2, a frit paste is applied by a dispenser, screen-printing, or the like, so as to form a paste layer 6 on a surface 4*a* of the glass member 4 along the region R to be fused. An example of the frit paste is one formed by kneading a powdery glass frit (glass powder) 2 made of amorphous low-melting glass (vanadium-phosphate-based glass, lead borosilicate glass, or the like), a laser-absorbing pigment (laser-absorbing material) which is an inorganic pigment such as iron oxide, an organic solvent such as amyl acetate, and a binder which is a resin component (such as acrylic resin) thermally decomposable at the glass softening temperature or lower. The paste layer 6 contains the glass frit, laser-absorbing pigment, organic solvent, and binder.

Subsequently, the paste layer 6 is dried, so as to eliminate the organic solvent, and further heated, so as to remove the binder, thereby firmly attaching the glass layer 3 to the surface 4*a* of the glass member 4 along the region R to be fused. Here, voids formed by the removal of the binder and the particle property of the glass frit 2 produce scattering of light exceeding the absorption characteristic of the laser-absorbing pigment, so that the glass layer 3 firmly attached to the surface 4*a* of the glass member 4 is in a low laser absorptance state (e.g., appears whiter under visible light).

Figure 3:
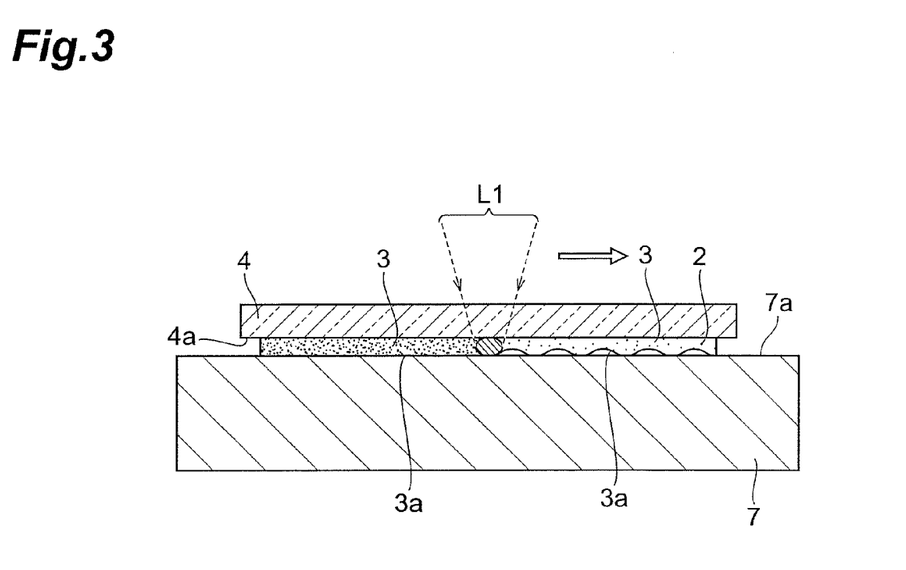
FIG. 3 is a sectional view for explaining the glass fusing method for manufacturing the glass fusing structure of FIG. 1.

Thereafter, as illustrated in FIG. 3, the glass member 4 is mounted on a surface 7*a* (a polished surface here) of a planar thermal conductor 7 made of aluminum, such that the glass layer 3 is interposed therebetween. As a consequence, the glass layer 3 formed by removing the organic solvent and binder from the paste layer 6 is disposed between the glass member 4 and the thermal conductor 7 along the region R to be fused.

Next, while using the thermal conductor 7 as a heatsink, the region R to be fused is irradiated therealong with a laser beam (first laser beam L1) such that a converging spot is located at the glass layer 3. This melts and resolidifies the glass layer 3 disposed between the glass member 4 and the thermal conductor 7, thereby burning the glass layer 3 onto the surface 4*a* of the glass member 4. As the voids are filled by the melting of the glass frit 2, the glass layer 3 burned onto the surface 4*a* of the glass member 4 loses its particle property and remarkably exhibits the absorption characteristic of the laser-absorbing pigment, thereby attaining a high laser absorptance state (e.g., appearing darker under visible light). The glass layer 3 burned onto the surface 4*a* of the glass member 4 is in a state where irregularities on its surface 3*a* opposite from the glass member 4 are made flat.

At the time of burning the glass layer 3, the thermal conductor 7 serves as the heatsink and draws heat from the glass layer 3, thereby inhibiting the glass layer 3 from falling into an excessive heat input state. Here, the thermal conductor 7 is made of aluminum, so that the thermal conductivity of the thermal conductor 7 is higher than that of the glass frit 2 and that of the glass member 4, whereby the heat is dissipated from the glass layer 3 to the thermal conductor 7 very efficiently.

Since the difference between the coefficients of linear expansion of the glass frit 2 and thermal conductor 7 is greater than the difference between the coefficients of linear expansion of the glass frit 2 and glass member 4, the glass layer 3 does not firmly attach to the surface 7a of the thermal conductor 7 at the time of burning. While this fact indicates that it will be more preferred if the difference between the coefficients of linear expansion of the glass frit 2 and thermal conductor 7 is greater, not only aluminum (having a coefficient of linear expansion of $23 \times 10^{-6}/K$) but stainless steel (having a coefficient of linear expansion of $17.3 \times 10^{-6}/K$) or copper (having a coefficient of linear expansion of $16.8 \times 10^{-6}/K$) can also constitute the thermal conductor 7 for use in combination with the glass frit 2 made of vanadium-phosphate-based glass (having a coefficient of linear expansion of $7.0 \times 10^{-6}/K$) or lead borosilicate glass (having a coefficient of linear expansion of $13 \times 10^{-6}/K$).

Figure 4:
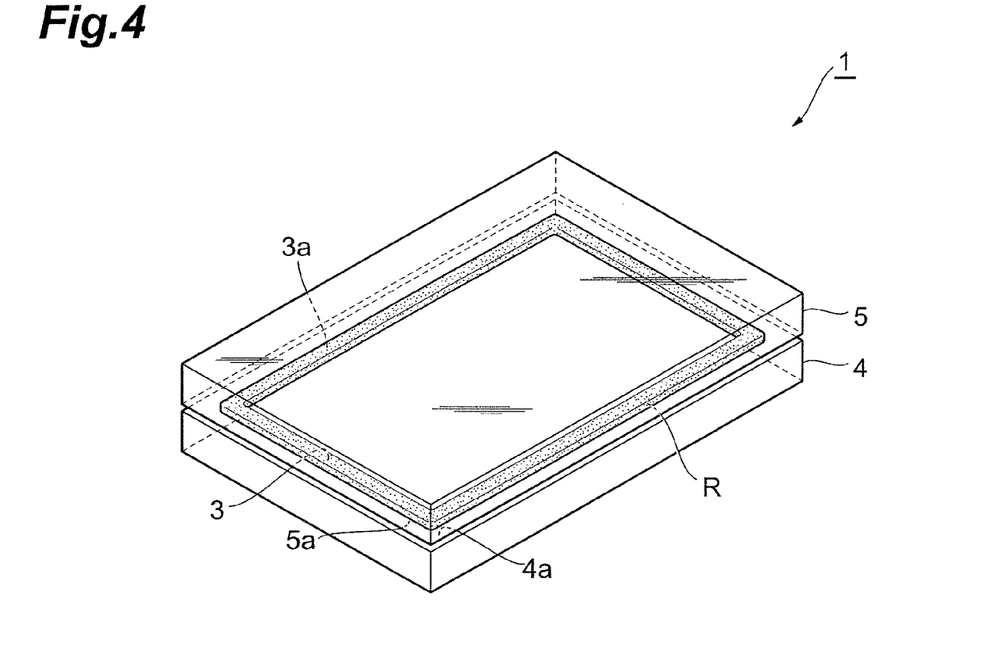
FIG. 4 is a perspective view for explaining the glass fusing method for manufacturing the glass fusing structure of FIG. 1.

Subsequent to the burning of the glass layer 3, as illustrated in FIG. 4, the glass member 5 is overlaid on the glass member 4 having the glass layer 3 burned thereonto, such that the glass layer 3 is interposed therebetween. Here, since the surface 3a of the glass layer 3 is made flat, a surface 5a of the glass member 5 comes into contact with the surface 3a of the glass layer 3 without gaps.

Figure 5:
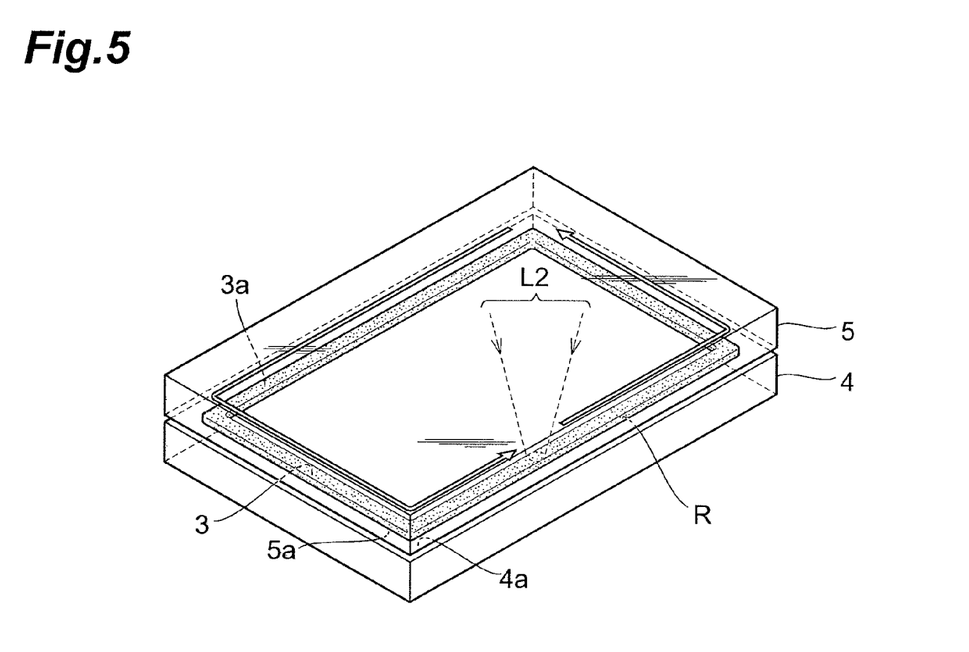
FIG. 5 is a perspective view for explaining the glass fusing method for manufacturing the glass fusing structure of FIG. 1.

Next, as illustrated in FIG. 5, the region R to be fused is irradiated therealong with a laser beam (second laser beam) L2 while locating a converging spot at the glass layer 3. As a consequence, the glass layer 3 in a high laser absorptance state absorbs the laser beam L2, so as to melt and resolidify the glass layer 3 and its peripheral portions (the portions of the glass members 4, 5 on their surfaces 4a, 5a), thereby bonding the glass members 4, 5 together. Here, since the surface 5a of the glass member 5 is in contact with the surface 3a of the glass layer 3 without gaps, the glass members 4, 5 are uniformly fused together along the region R to be fused.

As explained in the foregoing, the glass fusing method for manufacturing the glass fusing structure 1 disposes the glass layer 3 between the glass member 4 and the thermal conductor 7 along the region R to be fused and then emits the laser beam L1 while using the thermal conductor 7 as a heatsink, so as to melt the glass layer 3, thereby burning and fixing the glass layer 3 onto the glass member 4. While the laser absorptance of the glass layer 3 rapidly increases at the time of burning the glass layer 3, the thermal conductor 7 serves as the heatsink and draws heat from the glass layer 3, thereby inhibiting the glass layer 3 from falling into an excessive heat input state. This can prevent cracks from occurring in the glass members 4, 5 because of a heat shock due to excessive heat input at the time of burning the glass layer 3 even when the glass layer 3 is burned by irradiation with the laser beam L1. Further, at the time of burning the glass layer 3, the portion of the glass layer 3 on the surface 3a (i.e., the portion of the glass layer 3 located on the side of the glass member 5 to which it is to be fused) is not crystallized by excessive heat input and thus does not raise its melting point. Therefore, it is not necessary for the laser beam L2 to be emitted with such a high laser power as to melt the portion of the glass layer 3 on the surface 3a at the time of fusing the glass members 4, 5 together thereafter, whereby cracks can be prevented from occurring in the glass members 4, 5 because of a heat shock due to excessive heat input as in the burning of the glass layer 3. Hence, the above-mentioned glass fusing method can efficiently fuse the glass members 4, 5 together by preventing the glass members 4, 5 from being damaged.

The above-mentioned glass fusing method irradiates the glass layer 3 with the laser beam L1 from the glass member 4 side. Therefore, the interface part between the glass member 4 and the glass layer 3 is fully heated. Hence, the glass layer 3 can be strongly burned and fixed onto the glass member 4. This can also more reliably prevent the portion of the glass layer 3 (portion of the glass layer 3 on the surface 3a) located on the side of the glass member 5 to which it is to be fused from being crystallized by excessive heat input.

At the time of burning the glass layer 3, the portion of the glass layer 3 located on the side of the glass member 4 onto which it is to be burned may be crystallized by irradiation with the laser beam L1. At the time of fusing the glass members 4, 5 together, the portion of the glass layer 3 (the portion of the glass layer 3 on the surface 3a) located on the side of the glass member 5 to which it is to be fused may be crystallized by irradiation with the laser beam L2. This is because finally crystallizing the glass layer 3 reduces the coefficient of linear expansion of the glass layer 3 in the glass fusing structure 1.

Organic EL packages and the like have a small size themselves, for which thinner glass members 4, 5 are used, so that low expansion glass is often chosen as a material for the glass members 4, 5 in order to make them harder to break. Here, in order for the glass layer 3 to have a coefficient of linear expansion matching that of the glass members 4, 5 (i.e., in order to lower the coefficient of linear expansion of the glass layer 3), the glass layer 3 is made to contain a large amount of a filler constituted by ceramics or the like. By containing the large amount of the filler, the glass layer 3 changes its laser absorptance greatly between before and after irradiation with the laser beam L1. Therefore, the above-mentioned glass fusing method is effective in particular when low expansion glass is chosen as the material for the glass members 4, 5.

The present invention is not limited to the above-mentioned embodiment.

Figure 6:
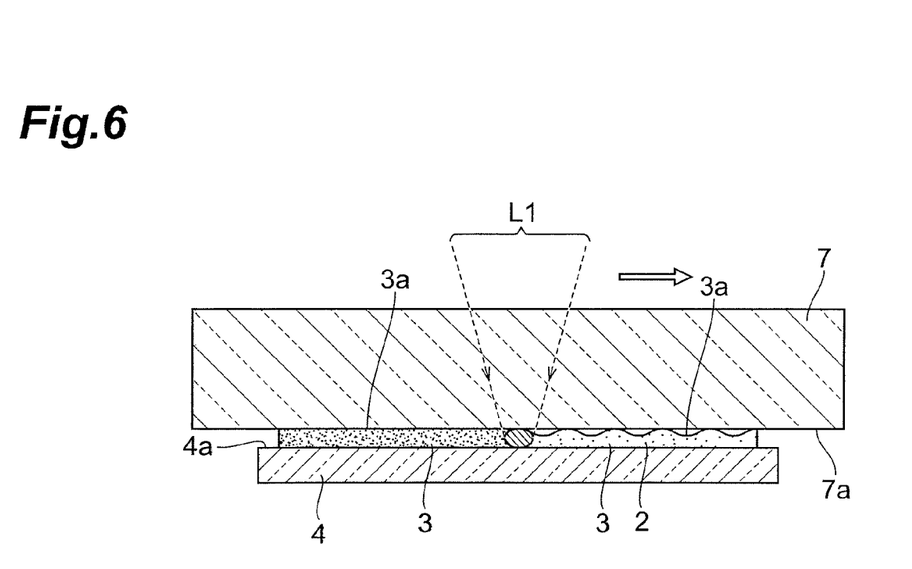
FIG. 6 is a sectional view for explaining the glass fusing method for manufacturing the glass fusing structure of FIG. 1.

For example, as illustrated in FIG. 6, a thermal conductor 7 made of a material transparent to the laser beam L1 may be used, so as to irradiate the glass layer 3 with the laser beam L1 through the thermal conductor 7 from the side opposite from the glass member 4.

After firmly attaching the glass layer 3 to the surface 7a of the thermal conductor 7 along the region R to be fused, the glass member 4 may be mounted on the surface 7a of the thermal conductor 7 such that the glass layer 3 is interposed therebetween, whereby the glass layer 3 formed by removing the organic solvent and binder from the paste layer 6 is disposed between the glass member 4 and the thermal conductor 7 along the region R to be fused.

INDUSTRIAL APPLICABILITY

The present invention can efficiently fuse glass members together by preventing the glass members from being damaged.

REFERENCE SIGNS LIST

1 . . . glass fusing structure; 2 . . . glass frit (glass powder); 3 . . . glass layer; 4 . . . glass member (first glass member); 5 . . . glass member (second glass member); 6 . . . paste layer; 7 . . . thermal conductor; R . . . region to be fused; L1 . . . laser beam (first laser beam); L2 . . . laser beam (second laser beam)

The invention claimed is:

1. A method for manufacturing a glass layer fixing member by fixing a glass layer to a first glass member, the method comprising the steps of:
    disposing the glass layer on the first glass member along a region to be fused, the glass layer containing a glass powder and a laser-absorbing material; and
    irradiating the region to be fused therealong with a first laser beam, so as to melt the glass layer, fix the glass layer to the first glass member, and increase a laser absorptance of the glass layer,
    wherein a laser absorbance rate of the glass layer is increased when the glass powder melts to fill voids causing loss of a particle property;
    overlaying a second glass member on the first glass member having the glass layer fixed thereto along the region to be fused such that the glass layer is interposed therebetween; and
    irradiating the region to be fused therealong with a second laser beam so as to fuse the first and second glass members together,
    wherein disposing the glass layer on the first glass member and irradiating the region to be fused with a first laser beam is implemented before the step of overlaying a second glass member.

2. The method according to claim 1, wherein the glass layer is irradiated with the first laser beam such that the glass layer attains a temperature higher than its melting point but lower than its crystallization temperature.

\* \* \* \* \*